United States Patent
Zhang et al.

(10) Patent No.: US 10,384,609 B2
(45) Date of Patent: Aug. 20, 2019

(54) VEHICLE REAR OBJECT PROXIMITY SYSTEM USING MULTIPLE CAMERAS

(71) Applicant: Ford Global Technologies, LLC, Dearborn, MI (US)

(72) Inventors: Yi Zhang, Sunnyvale, CA (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/628,062

(22) Filed: Jun. 20, 2017

(65) Prior Publication Data

US 2018/0361929 A1    Dec. 20, 2018

(51) Int. Cl.
  *G05D 1/02*  (2006.01)
  *G05D 1/00*  (2006.01)
  (Continued)

(52) U.S. Cl.
  CPC ............... *B60R 1/00* (2013.01); *B60D 1/26* (2013.01); *B60D 1/363* (2013.01); *B60D 1/366* (2013.01);
  (Continued)

(58) Field of Classification Search
  CPC ... B60D 1/58; B60D 1/36; B60D 1/62; B62D 15/0285; B62D 15/0265; B62D 13/06; B62D 15/025; B62D 15/027; B62D 15/028; B62D 15/0295; B62D 6/00; G01S 11/12; B60S 1/0844; B60S 1/0885; G06T 2207/10012; G06T 7/593; G06T 7/74; G06T 2207/30252; G06T 2207/10016; G06T 2207/10024; G06T 7/246; H04N 13/239; H04N 7/181; H04N 13/218; H04N 2013/0081; H04N 5/23238; H04N 5/23293; H04N 5/247; H04N 5/272; H04N 7/18; H04N 7/183; B60W 10/18; B60W 2420/42; B60W 2540/00; B60W 2550/10; B60W 50/0098; B60W 50/10; B60W 10/04; B60W 10/184; B60W 10/20; B60W 2050/146; B60W 2420/54; B60W 2520/10; B60W 30/095; B60W 30/0956; B60W 30/10; B60W 50/14; G06K 9/00791;
  (Continued)

(56) References Cited

U.S. PATENT DOCUMENTS 6,396,397 B1    5/2002 Bos et al.
6,477,260 B1 *  11/2002 Shimomura ......... H04N 13/239
                                                    382/106

(Continued)

FOREIGN PATENT DOCUMENTS

KR    1020060080648 A    7/2006
KR    100929689 B1    12/2009

*Primary Examiner* — Dionne Pendleton
(74) *Attorney, Agent, or Firm* — Raymond Coppiellie; Price Heneveld LLP

(57) ABSTRACT

A vehicle hitch assistance system includes first and second cameras on an exterior of the vehicle and an image processor. The image processor is programmed to identify an object in image data received from the first and second cameras and determine a height and a position of the object using the image data. The system further includes a controller outputting a steering command to a vehicle steering system to selectively guide the vehicle away from or into alignment with the object.

12 Claims, 9 Drawing Sheets

(51) Int. Cl.
| | |
|---|---|
| *B60R 1/00* | (2006.01) |
| *H04N 7/18* | (2006.01) |
| *B60D 1/36* | (2006.01) |
| *B62D 15/02* | (2006.01) |
| *B60D 1/48* | (2006.01) |
| *B60D 1/58* | (2006.01) |
| *B60D 1/26* | (2006.01) |
| *G01C 21/00* | (2006.01) |
| *G01C 21/32* | (2006.01) |

(52) U.S. Cl.
CPC .............. *B60D 1/481* (2013.01); *B60D 1/58* (2013.01); *B60R 1/003* (2013.01); *B62D 15/0275* (2013.01); *B62D 15/0285* (2013.01); *B62D 15/0295* (2013.01); *G01C 21/005* (2013.01); *G01C 21/32* (2013.01); *H04N 7/181* (2013.01); *H04N 7/183* (2013.01); *B60K 2350/1024* (2013.01); *B60R 2300/303* (2013.01); *B60R 2300/605* (2013.01); *B60R 2300/607* (2013.01); *B60R 2300/808* (2013.01)

(58) Field of Classification Search
CPC ........... G06K 9/00832; G06K 9/00805; G06K 9/00798; B60N 2/002; B60N 2/0228; B60Q 9/005; B60Q 9/008; B60Q 1/14; B60Q 1/1423; B60Q 1/302; B60Q 1/50; B60Q 1/525; B60Q 2300/054; B60Q 2300/056; B60Q 2300/21; B60Q 2300/314; B60Q 2300/3321; B60Q 2300/41; B60Q 2300/42; B60Q 9/006; B60R 11/04; B60R 21/0134; B60R 22/48; B60R 1/00; B60R 2300/105; B60R 2300/303; B60R 2300/307; B60R 2300/802; B60R 2300/8066; B60R 1/12; B60R 2001/1253; B60R 2300/106; B60R 2300/205; B60R 2300/607; B60R 2300/80; B60R 2300/8046; B60R 2300/8053; B60R 2300/806; B60R 2300/808; B60R 2300/8093; B60R 1/002; B60R 1/088; B60R 2001/1223; B60R 21/01538; B60R 2300/101; B60R 2300/103; B60R 2300/107; B60R 2300/20; B60R 2300/207; B60R 2300/30; B60R 2300/304; B60R 2300/50; B60R 2300/8026; B60R 2300/804; B60R 2300/8086; G08G 1/166; G08G 1/04; G08G 1/052; G08G 1/095; G08G 1/096783; G08G 1/161; G08G 1/163; G08G 1/165; B60G 17/015; B60K 2350/106; B60K 2350/1088; B60K 2350/2013; B60K 2350/2017; B60K 2350/2026; B60K 2350/2095; B60K 2350/927; B60K 35/00; B60T 2201/08; B60T 2201/082; B60T 7/22; B60Y 2400/92; G01J 1/4204; G01J 1/4228; G01P 1/08; G02B 3/14; G03B 2217/002; G03B 37/00

See application file for complete search history.

(56) References Cited

U.S. PATENT DOCUMENTS

| | | | |
|---|---|---|---|
| 7,123,168 | B2 | 10/2006 | Schofield |
| 7,378,947 | B2 | 5/2008 | Daura Luna et al. |
| 8,004,425 | B2 | 8/2011 | Hoek et al. |
| 9,359,009 | B2 | 6/2016 | Ignaczak et al. |
| 9,446,713 | B2 | 9/2016 | Lu et al. |
| 2005/0146607 | A1 | 7/2005 | Linn et al. |
| 2009/0122140 | A1* | 5/2009 | Imamura ............... B60Q 9/005 348/148 |
| 2010/0324770 | A1* | 12/2010 | Ramsey ................. B60D 1/36 701/25 |
| 2014/0012465 | A1* | 1/2014 | Shank ................... B60D 1/58 701/36 |
| 2014/0067206 | A1 | 3/2014 | Pflug |
| 2014/0160276 | A1 | 6/2014 | Pliefke et al. |
| 2014/0340510 | A1 | 11/2014 | Ihlenburg et al. |
| 2016/0052548 | A1 | 2/2016 | Singh et al. |
| 2016/0137126 | A1* | 5/2016 | Fursich ................. B60R 1/00 348/38 |
| 2017/0357267 | A1* | 12/2017 | Foster ................. A01B 79/005 |

* cited by examiner

VEHICLE REAR OBJECT PROXIMITY SYSTEM USING MULTIPLE CAMERAS

FIELD OF THE DISCLOSURE

The present disclosure generally relates to a vehicle system for assisting in aligning the vehicle for hitching with a trailer. In particular, the system controls the steering of the vehicle to bring the vehicle hitch ball into alignment with a trailer hitch.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer.

SUMMARY OF THE DISCLOSURE

According to one aspect of the present disclosure, a vehicle hitch assistance system includes first and second cameras on an exterior of the vehicle and an image processor. The image processor is programmed to identify an object in image data received from the first and second cameras and determine a height and a position of the object using the image data. The system further includes a controller outputting a steering command to a vehicle steering system to selectively guide the vehicle away from or into alignment with the object.

Embodiments of the first aspect of the invention can include any one or a combination of the following features:

the object is a first object identified as a hitch of a trailer, and the controller outputs the steering command to maintain the vehicle along a path derived by the controller to guide a hitch ball of the vehicle into alignment with the hitch of the trailer from an initial set of data received from the first and second cameras;

the image processor is further programmed to identify a second object in the image data received from the first and second cameras as an obstacle and determine a height and a position of the obstacle using the image data, and the path is further derived by the controller to guide the vehicle away from the obstacle;

the object is a first object identified as a hitch of a trailer, the image processor is further programmed to track the position of the hitch using image data from at least one of the first and second cameras during movement of the vehicle, and output a tracked position of the hitch, and the controller outputs the steering command according to a predetermined steering sequence, the controller progressing through the sequence based on the tracked position of the hitch to guide a hitch ball of the vehicle into alignment with the hitch;

the image processor is further programmed to identify a second object in the image data received from the first and second cameras as an obstacle, determine a height and a position of the obstacle using the image data, and track the position of the obstacle using image data from at least one of the first and second cameras during movement of the vehicle and output a tracked position of the obstacle, and the controller further progresses through the sequence based on the tracked position of the obstacle to guide the vehicle away from the obstacle;

the image processor combines the image data received from the first and second cameras into stereoscopic image data and determines the height and position of the object using the image data by reconstructing a three-dimensional scene of a portion of an area surrounding the vehicle using the stereoscopic image data; or the image processor is further programmed to track the position of the object relative to the vehicle within the three-dimensional scene using two-dimensional image data from one of the first and second cameras.

According to another aspect of the present disclosure, a vehicle includes a steering system, a hitch ball mounted on an exterior of the vehicle, first and second cameras on the exterior, and a hitch assistance system. The hitch assistance system includes an image processor programmed to identify an object in image data received from the first and second cameras and determine a height and a position of the object using the image data and a controller outputting a steering command to the steering system to selectively guide the vehicle away from the object or guide the hitch ball into alignment with the object.

According to another aspect of the present disclosure, a method for assisting a vehicle in hitching with a trailer includes processing image data received from first and second vehicle cameras to identify the trailer hitch in the image data received from the first and second cameras and determine a height and a position of the trailer hitch using the image data. The method further includes controlling a vehicle steering system to guide the vehicle into alignment of a vehicle hitch ball with the trailer hitch.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
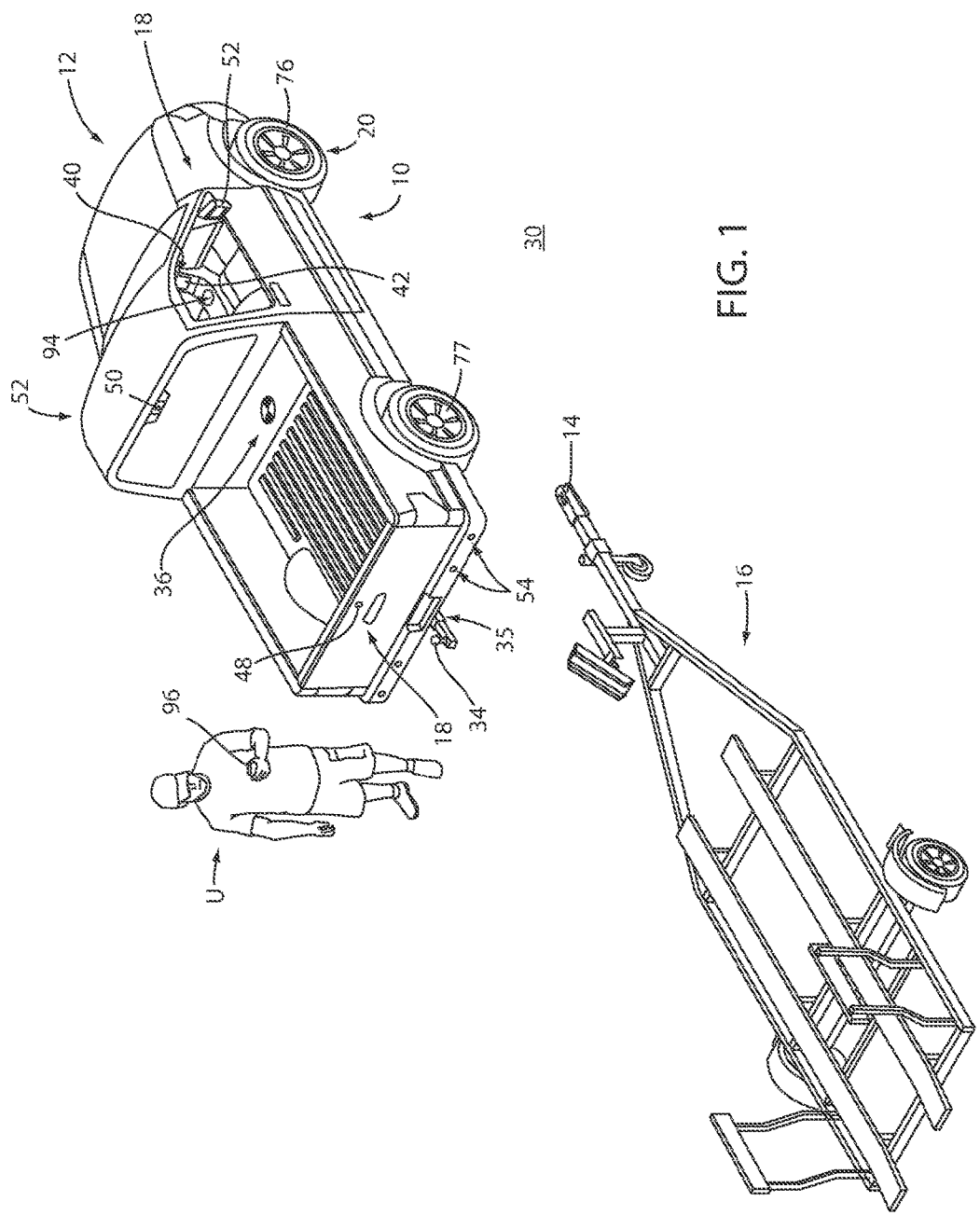
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-8, reference numeral 10 designates a hitch assistance system for a vehicle 12. In particular, the system 10 includes at least a first camera and a second camera of the illustrated rear camera 48 (which is mounted on the liftgate of the truck depicted in FIG. 1, but can also be mounted in a license plate frame, bumper, trunk lid or the like), center high-mount stop light ("CMHSL") camera 50, and side-view cameras 52a and 52b. System 10 further includes an image processor or other device configured for executing an image processing routine 64 programmed to identify an object, including at least one of a trailer hitch 14 or an obstacle O, within image data 55 received from the first and second cameras (of rear camera 48, CMHSL camera 50, and side-view cameras 52a, 52b) and determine a height H and a position (by a distance $D_o$ or $D_h$ and angle $\alpha_o$ or $\alpha_h$, as shown in FIGS. 3-7, for example) of the object (of trailer hitch 14 or obstacle O, for example) using the image data 55. The system 10 further includes a controller 26 outputting a steering command 69 to a vehicle steering system 20 to selectively guide the vehicle 12 away from or into alignment with the object (of trailer hitch 14 or obstacle O, respectively).

Figure 2:
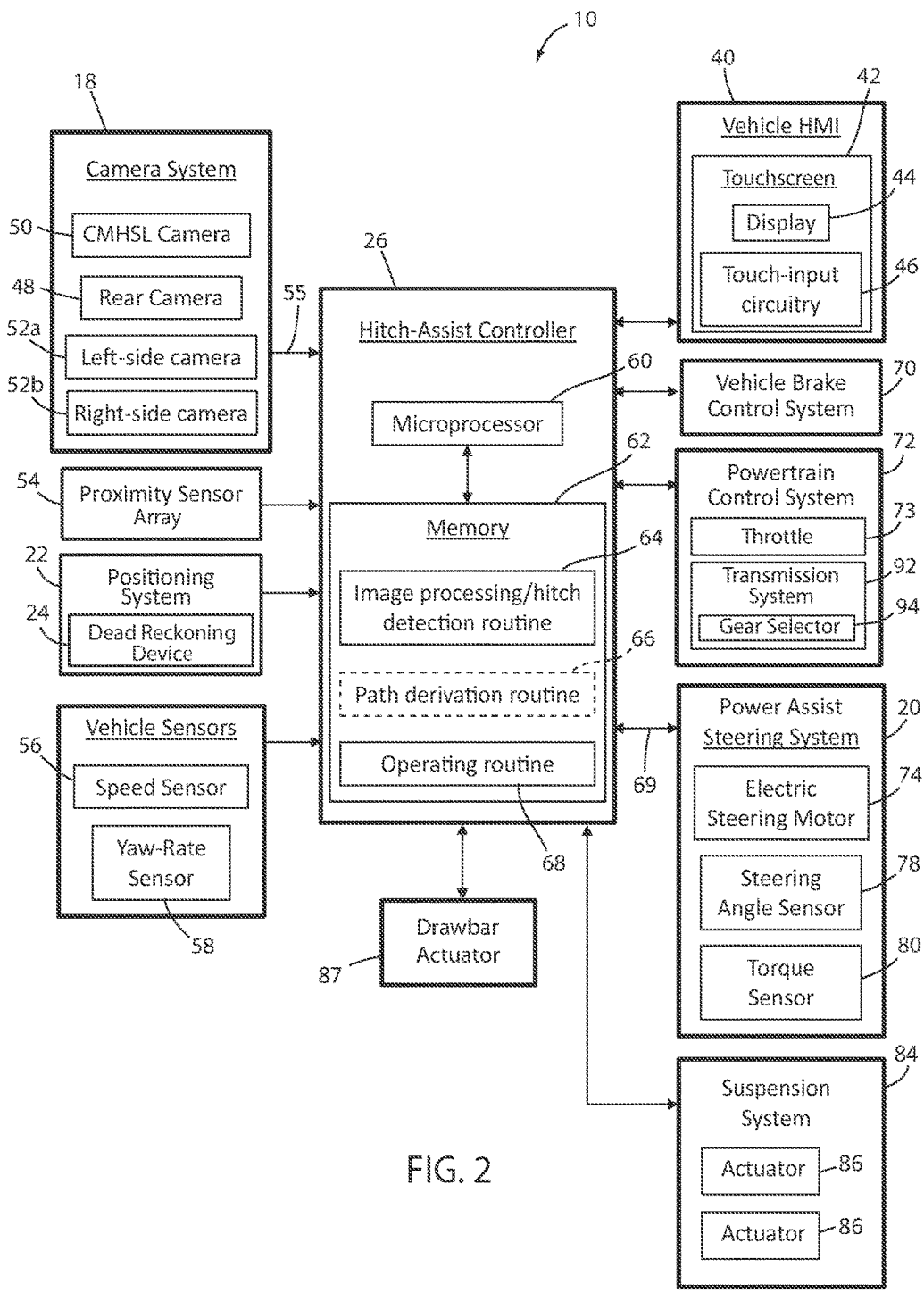
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system based at least on vehicle speed and steering angle δ. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected hitch 14, that the controller 26 of the hitch assist system 10 may process with various routines to determine the height H and position (e.g., based on the distance $D_h$ and angle $\alpha_h$) of hitch 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command 69, whereby the steering angle δ may be sensed by a steering angle sensor 78 of the power assist steering system 20. The steering command 69 may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
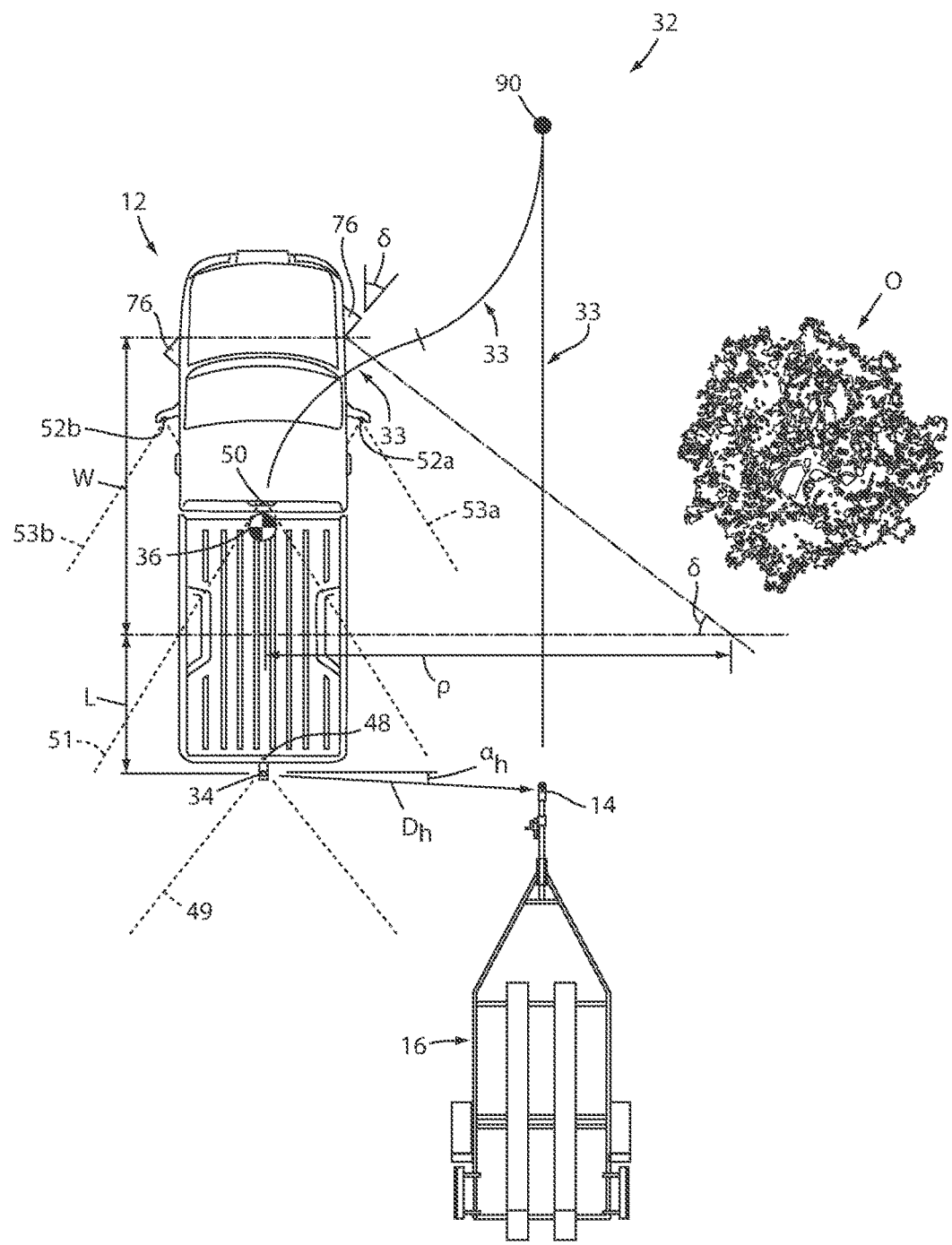
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the camera system 18, the power assist steering system 20, a vehicle brake system 70, a powertrain system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate γ, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the hitch 14 of trailer 16, which can reduce the potential for a collision with trailer 16, for example. It is disclosed herein that the hitch assist system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 and an on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the camera system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the hitch 14 of trailer 16. The controller 26 may include the microprocessor 60 and/or other analog and/or digital circuitry for processing one or more routines. Also, the controller 26 may include the memory 62 for storing one or more routines, including an image processing 64 routine and/or hitch detection routine, a path derivation routine 66 and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated, that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate a camera system 18 that includes the above-mentioned plurality of cameras, which in the illustrated examples include rear camera 48, center high-mount stop light (CMHSL) camera 50, and side-view cameras 52a and 52b, although other arrangements including additional or alternative cameras are possible. In general, the various cameras included in camera system 18 can be positioned to generally overlap in their respective fields of view, which in the depicted arrangement include fields of view 49, 51, 53a, and 53b to correspond with rear camera 48, center high-mount stop light (CMHSL) camera 50, and side-view cameras 52a and 52b, respectively. In this manner, image data 55 from two or more of the cameras can be combined in image processing routine 64 into stereoscopic image data 55 that can be used to reconstruct a three-dimensional scene of the area or areas within overlapped areas of the various fields of view, including any objects (obstacles O or hitch 14, for example) therein. In general, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within camera system 18. The object-identifying data can then be compared among the various sets of image data 55 from the cameras 48, 50, 52a, and 52b to determine the presence in two or more of the cameras. The location of the object within each of the sets of image data 55 can be determined and compared with other available location data to determine the position of the object relative to the image sources using known means. The image processing routine 64 can include information related to the positioning of cameras 48, 50, 52a, and 52b on vehicle 12, including relative to the center 36 of vehicle 12, for example such that the positions of cameras 48, 50, 52a, and 52b relative to each other can be used for objection positioning calculations and to result in object position data relative to the center 36 of vehicle 12, for example, or other features of vehicle (such as hitch ball 34) with known positions relative to center 36.

When the image processing routine 64 has determined the positioning of the object relative to vehicle 12, the image processing routine 64 can further use the two dimensional image data 55 from cameras 48, 50, 52a, and 52b to determine the height H of the identified object relative to the ground on which vehicle 12 rests (the heights of the cameras 48, 50, 52a, and 52b being known with respect to the ground). When used, in particular, in identifying the hitch 14 of trailer 16 for vehicle guidance in aligning the hitch ball 34 with hitch 14, knowing the height H of hitch 14 can be particularly advantageous, as during certain points of such guidance, only a single camera 48, 50, 52a, and 52b may have hitch 14 within its field of view 49, 51, 53a, and 53b. In particular, when vehicle 12 reverses into close proximity with hitch 14, only the rear camera 48 may have hitch 14 in its field of view 49. Given that alignment of hitch ball 34 with hitch 14 may require accurate monitoring of the position $D_h$, $α_h$, of hitch 14 to achieve proper alignment and to avoid vehicle 12 collision with hitch 14 (the bumper of vehicle 12 potentially being only inches from hitch ball 34), prior determination of the height H of hitch ball 34 may prove advantageous. In this manner, a single vision system (i.e. having only one camera, such as a rear camera 48) may estimate distance to an object using focal length data from the camera. However, because the height of the object is not known, objects are assumed to be on the ground. Because a hitch 14 will generally be suspended above the ground, errors may result in identifying the position of the object. In the case of obstacle O avoidance, an error can be used to keep vehicle 12 far enough away from the obstacle O to avoid collision. However, because the proximity of vehicle 12 to hitch 14 for effective hitch assistance is small, any error may preclude appropriate alignment of hitch ball 34 with hitch 14.

In this manner, once the image processing routine 64 can identify hitch 14 and determine the height H thereof based on the positioning $D_h$, $α_h$ determination made using data 55 from multiple cameras 48, 50, 52a, or 52b, the known height H can be used to improve single camera object tracking based, for example on focal length distance estimation. It is also noted that the improved accuracy of object tracking in this manner may also allow for vehicle 12 to reliably navigate closer to obstacles O during a hitching operation, which may reduce the number of maneuvers needed to align hitch ball 34 with hitch 14 or may reduce the occurrence of situations where such a maneuver is determined by operating routine 68 to be unachievable.

The image processing routine 64 can be specifically programmed or otherwise configured to locate hitch 14 within image data 55. In one example, the image processing routine 64 can identify the hitch 14 within the image data 55 based on stored or otherwise known visual characteristics of hitch 14 or hitches in general. In another embodiment, a marker in the form of a sticker or the like may be affixed with trailer 16 in a specified position relative to hitch 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of hitch 14 relative to such a marker so that the location 28 of hitch 14 can be determined based on the marker location. Additionally, or alternatively, controller 26 may seek confirmation of the determined hitch 14, via a prompt on touchscreen 42. If the hitch 14 determination is not confirmed, further image processing may be provided, or user-adjustment of the hitch location 28 may be facilitated, either using touchscreen 42 or another input to allow the user to move the depicted hitch location 28 on screen 42, which controller 26 uses to adjust the determination of hitch location 28 with respect to vehicle 12 based on the above-described use of image data 55. Alternatively, the user can visually determine the position of hitch 14 within an image presented on HMI 40 (that can be similar to that which is depicted in FIGS. 4A, 4B, 6A, and 6B) in and can provide a touch input on touchscreen 42 in such a location by touching or tapping image 30 on the location 28 of hitch 14 therein in a manner similar to that which is described in co-pending, commonly-assigned U.S. patent application Ser. No. 15/583,014, the entire disclosure of which is incorporated by reference herein. The image processing routine 64 can then correlate the location of the touch input with the coordinate system 82 applied to image 30. Once the hitch 14 has been identified, image processing can designate any other objects as obstacles O and can identify the same obstacle within the image data 55 from multiple cameras 48, 50, 52a, and 52b to determine the positioning $D_o$, $α_o$ and height H of the identified obstacles O relative to vehicle 12. It is noted that, although the positioning of objects relative to vehicle 12 is shown and described herein in a variation of a polar coordinate system (based on either the center 36 of vehicle 12 or the location of hitch ball 34), a Cartesian coordinate system may be used in a similar manner.

As shown in the sequence of FIGS. 3-8, the image processing routine 64 and operating routine 68 may be used in conjunction with each other to guide vehicle 12 into alignment between hitch ball 34 and hitch 14 of trailer 16. In the example shown, an initial position of vehicle 12 relative to trailer 16 may be such that hitch 14 is only in the field of view 53a of side camera 52a (as shown in FIG. 4A), with vehicle 12 being positioned laterally from trailer 16 but with hitch 14 being almost longitudinally aligned with hitch ball 34. In this manner, upon initiation of system 10, such as by user input on touchscreen 42, for example, image processing routine 64 can, nevertheless identify hitch 14 within the image data 55 of camera 52a and estimate the position of hitch 14 relative to hitch ball 34 using the two-dimensional data, including by receiving focal length information within data 55 or by other known means. Once the positioning $D_h$, $α_h$ of hitch 14 has been determined and, optionally, confirmed by the user, controller 26 can take control of at least the vehicle steering system 20 to control the movement of vehicle 12 along the desired path 32 to align the vehicle hitch ball 34 with hitch 14.

Continuing with reference to FIG. 3 with additional reference to FIG. 2, controller 26, having initially estimated the positioning $D_h$, $α_h$ of hitch 14, as discussed above, can, in one example, execute path derivation routine 66 to determine vehicle path 32 to align the vehicle hitch ball 34 with hitch 14. In particular, controller 26 can have stored in memory 62 various characteristics of vehicle 12, including the wheelbase W, the distance from the rear axle to the hitch ball 34, which is referred to herein as the drawbar length L, as well as the maximum angle to which the steered wheels 76 can be turned $δ_{max}$. As shown, the wheelbase W and the current steering angle δ can be used to determine a corresponding turning radius ρ for vehicle 12 according to the equation:

$$\rho = \frac{1}{W \tan \delta}, \quad (1)$$

in which the wheelbase W is fixed and the steering angle δ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}}. \quad (2)$$

Path derivation routine 66 can be programmed to derive vehicle path 32 to align a known location of the vehicle hitch ball 34 with the estimated position of hitch 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the hitch 14 and a forward or rearward distance to hitch 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with hitch 14.

As discussed above, once the desired path 32 has been determined, controller 26 is then allowed to at least control the steering system 20 of vehicle 12 with the powertrain system 72 and the brake system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and steering system 20 geometry, can adjust the steering angle δ, as dictated by path 32, depending on the position of vehicle 12 therealong. It is additionally noted that in an embodiment, the path 32 may comprise a progression of steering angle δ adjustment that is dependent on the tracked vehicle position.

As illustrated in FIG. 3, the initial positioning of trailer 16 relative to vehicle 12 may be such that forward movement of vehicle 12 is needed within a desired vehicle path 32, such as when trailer 16 is located laterally to the side of vehicle 12. In this manner, path 32 may include various segments 33 that require forward driving or rearward driving of vehicle 12 separated by inflection points 90 at which vehicle 12 must transition between such forward and rearward driving. In an embodiment, path derivation routine 66 can configured to include a straight backing segment 33 for a defined distance before reaching the point at which hitch ball 34 is aligned with hitch location 28. The remaining segments 33 can be determined to achieve the needed lateral and forward/backward movement within the smallest area possible and/or with the lowest number of overall segments 33 or inflection points 90. In the illustrated example of FIG. 3, path 32 can include two segments 33 that collectively traverse a needed lateral movement of vehicle 12, while providing a segment 33 of straight, rearward backing to bring hitch ball 34 into alignment with hitch 14, one of which includes forward driving with a maximum steering angle $\delta_{max}$ in the rightward-turning direction and the other including forward driving with a maximum steering angle $\delta_{max}$ in the leftward-turning direction. Subsequently, a single inflection point 90 is included in which vehicle 12 transitions from forward driving to rearward driving followed by the previously-mentioned straight rearward backing segment 33. It is noted that variations in the depicted path 32 may be used, including a variation with a single forward-driving segment 33 at a rightward steering angle δ less than the maximum steering angle $\delta_{max}$, followed by an inflection point 90 and a rearward driving segment 33 at a maximum leftward steering angle $\delta_{max}$ with a shorter straight backing segment 33, with still further paths 32 being possible. In a further variation, path derivation routine 66 can receive an indication of whether the provided positioning $D_h$, $\alpha_h$ of hitch 14 is an estimate based on two-dimensional image data 55 or is a derivation using stereoscopic image data 55 obtained from multiple ones of cameras 48, 50, 52a, or 52b. If an estimate is provided, path derivation routine 66 can prioritize initial movement of vehicle 12 along a path 32 that moves hitch 14 into a field of view 49, 51, 53a, 53b of an additional camera, which in the illustrated example is CMHSL camera 50 such that an derived position $D_h$, $\alpha_h$ of hitch 14 can be determined as early as possible within execution of operating routine 68 to minimize corrections.

Figure 4A:
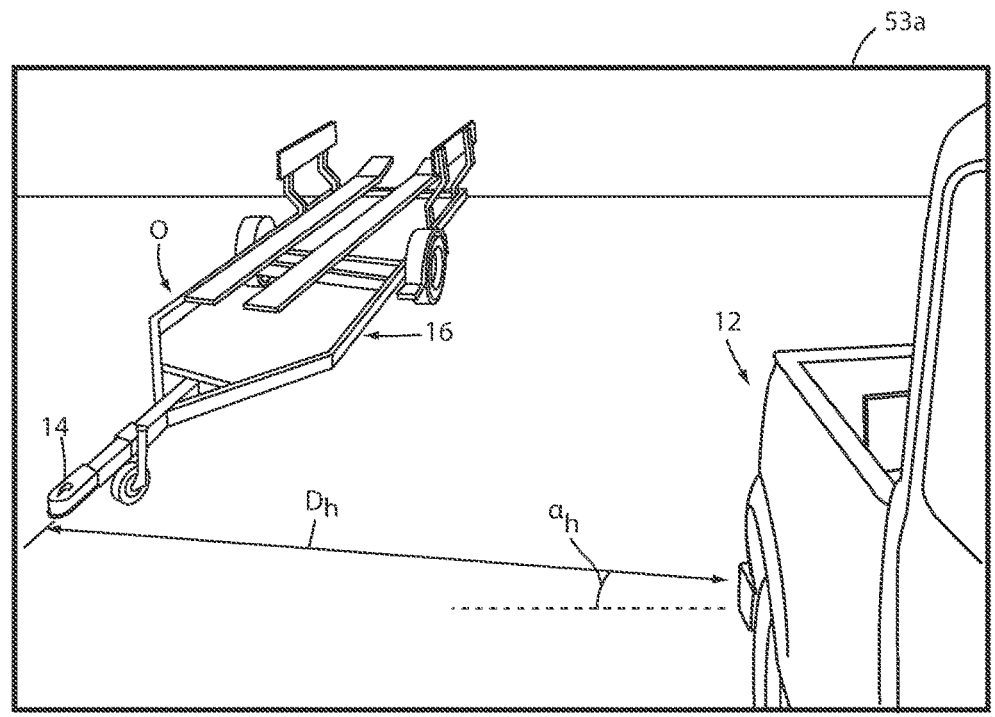
FIGS. 4A and 4B are depictions of images received from respective vehicle cameras during the alignment sequence step of FIG. 3.
Figure 4B:
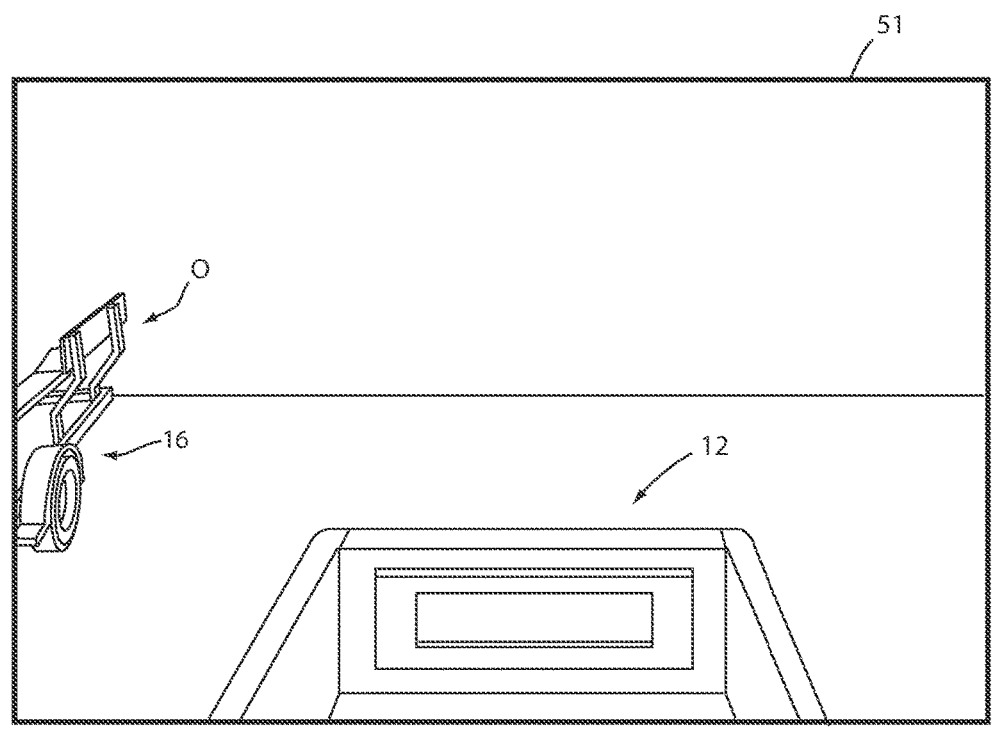

Still further, path derivation routine 66 can also be configured to avoid any obstacles within the field of view 49, 51, 53a, 53b of any of the cameras 48, 50, 52a, 52b. As shown in FIGS. 3, 4A, and 4B, the trailer 16 may be at least partially visible by multiple cameras, which are side camera 52a (FIG. 4A) and CMHSL camera 50 (FIG. 4B). In this manner, image processing routine 64 may be configured to identify hitch 14 as a discrete object within image data 55 such that the larger trailer 16 is, by default, identified as an obstacle O such that image processing routine 64 can provide positioning data for trailer 16 and path derivation routine 66 can derive path 32 to maintain vehicle 12 away from object O in the form of trailer 16. In this manner, the initial direction of path 32 may be determined in the depicted manner, rather than reversing and turning toward trailer 16. Alternatively, image processing routine 64 may specifically identify trailer 16 and derive path 32 accordingly.

In an embodiment, the driver of vehicle 12 may retain control of the vehicle 12 transmission system 92, which is used for controlling whether vehicle 12 is in a forward driving gear or is in reverse. In such an embodiment, controller 26, upon determining that the vehicle position 36 corresponds with an inflection point 90 can prompt the driver, such as by a prompt displayed on HMI 40, to change the gear, according to the direction of the segment 33 that follows the inflection point 90. In an aspect, controller 26 can use the positioning system 22, including dead reckoning device 24 to check whether the needed change in gear selection has been made by confirming that vehicle 12 is traveling in the desired direction before removing the prompt. Further, controller 26 can provide an audible prompt and/or can notify the user U that the system 10 will be disabled if the appropriate gear is not selected within a predetermined distance of continued movement of vehicle 12 in the wrong direction.

In an alternative embodiment, controller 26 can be in communication with transmission system 92, as shown in FIG. 2. In such an embodiment, controller 26 can directly confirm if the desired direction has been selected by the user. Alternatively, controller 26 and transmission system 92 can be configured such that controller 26 can change the direction of transmission system 92 directly. In such an embodiment, transmission system 92 can include, for example, an electronic gear selector 94, such as a rotary selector or a pushbutton selector, wherein the selection of a gear is made electronically and transmission system 92 configures itself electromechanically in response to the electronic communication. Accordingly, controller 26 can communicate with transmission system 92 either directly or through an electronic gear selector 94 to change the direction of the transmission, as needed, by controller 26 during execution of operating routine 68.

In a further embodiment, the driver of vehicle 12 may remain in control of the vehicle powertrain control system 72, including by control of a vehicle throttle 73, and the vehicle brake system 70. In such an embodiment, controller 26 can communicate to the driver by prompts on HMI 40, for example, to apply the vehicle throttle 73 or brakes, as needed to allow vehicle 12 to move at an appropriate speed for system 10, including such that controller 26 can accurately monitor the position 36 and/or implement the desired control of steering system 20 according to the responsiveness of steering motor 74, for example. In one aspect, controller 26 can deactivate operating routine 68 if, for example, the vehicle 12 is traveling at an excessive speed, and can notify the driver via HMI 40, as needed, of such deactivation.

In a still further alternative embodiment, controller 26 can control the vehicle brake system 70 and the powertrain system 72 such that hitch assist system 10 can accelerate and decelerate vehicle 12, as needed, to cause the desired movement of vehicle 12, while controlling steering system 20 to maintain vehicle 12 along path 32, as discussed above. This control of the vehicle brake system 70 and the powertrain system 72 can be implemented in combination with the above-described control of transmission system 92 by controller 26 or by the driver. In one aspect, the configuration of system 10 with controller 26 in communication with and able to control steering system 20, powertrain system 72, brake system 70, and transmission system 92 can allow hitch assist system 10 to autonomously control vehicle 12 during a hitch alignment operation. This configuration can further allow a user U to remotely control vehicle 12 from an exterior 30 of vehicle 12 using a remote device 96, such as a smartphone (with appropriate software) or the like, as shown in FIG. 1.

Returning to FIGS. 2-8, hitch assist system 10, during execution of operating routine 68, can use the dead reckoning device 24 alone to track the location 36 of vehicle 12. In this manner, as controller 26 executes operating routine 68, it can receive data from dead reckoning device 24 regarding the position of vehicle 12, which dead reckoning device 24 determines based on information received from vehicle speed sensor 56 and vehicle yaw rate sensor 58 to monitor vehicle 12 heading and movement in real-time. In an example, dead reckoning device 24 can also receive data from powertrain control system 72 and steering system 20 to further use to track vehicle 12 movement and/or position within the designated coordinate system, in which the above-described reconstructed scene using image data 55 can also position hitch 14 and objects O therein. In a further embodiment, controller 26 can also receive data from other devices in the positioning system 22, including from a global positioning system ("GPS") device or the like to serve as a check on dead reckoning device 24, when traveling over relatively long distances (i.e. at least 10 feet or in an embodiment at least 30 feet). In a further embodiment, controller 26 can receive data from one or more proximity sensors 54, such as an array or ultrasonic sensors mounted on the rear of vehicle 12 to potentially improve accuracy regarding the location 28 of hitch 14 at close distances thereto (e.g., within five feet or less).

Figure 5:
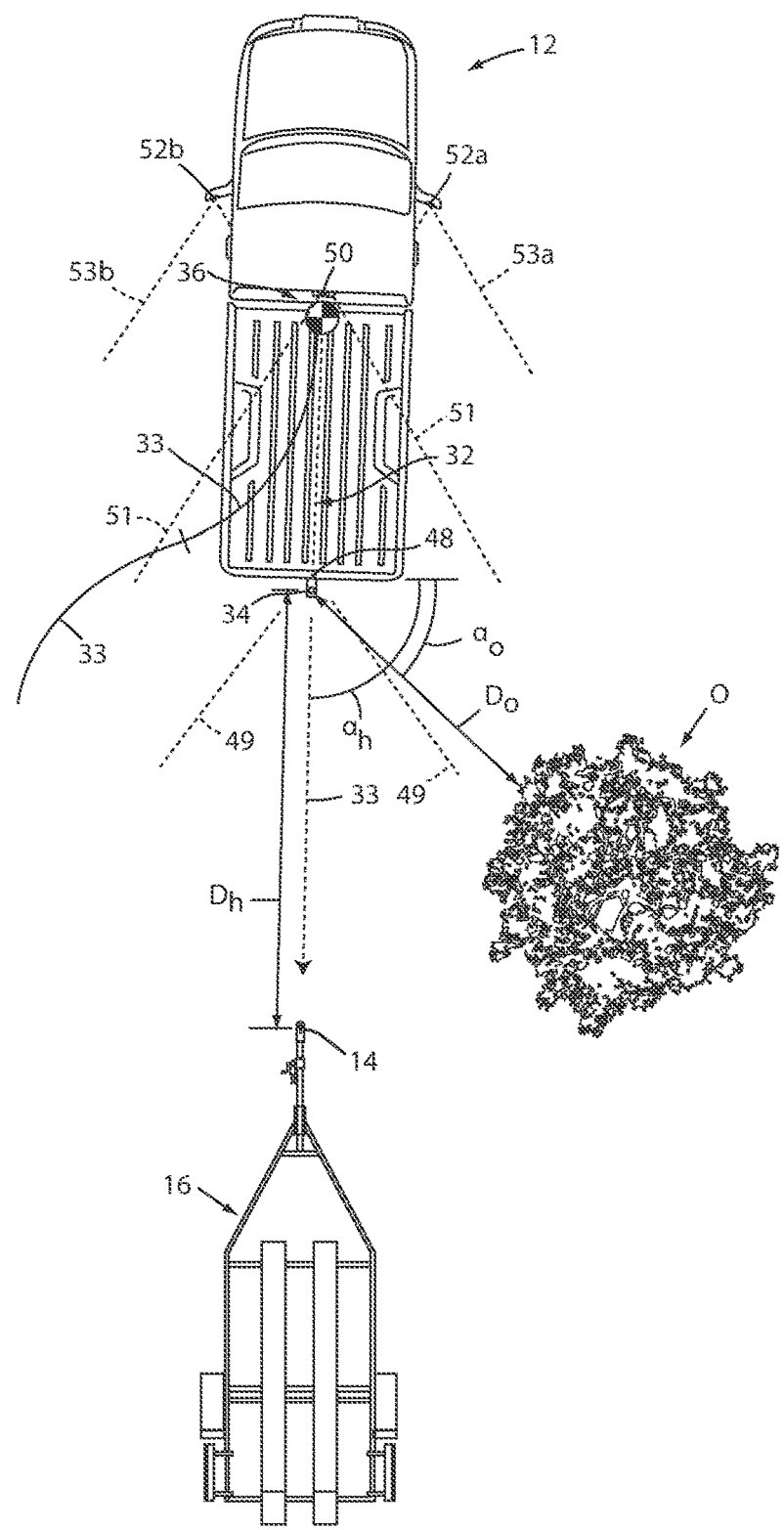
FIG. 5 is an overhead schematic view of the vehicle during a subsequent step of the alignment sequence with the trailer.
Figure 6A:
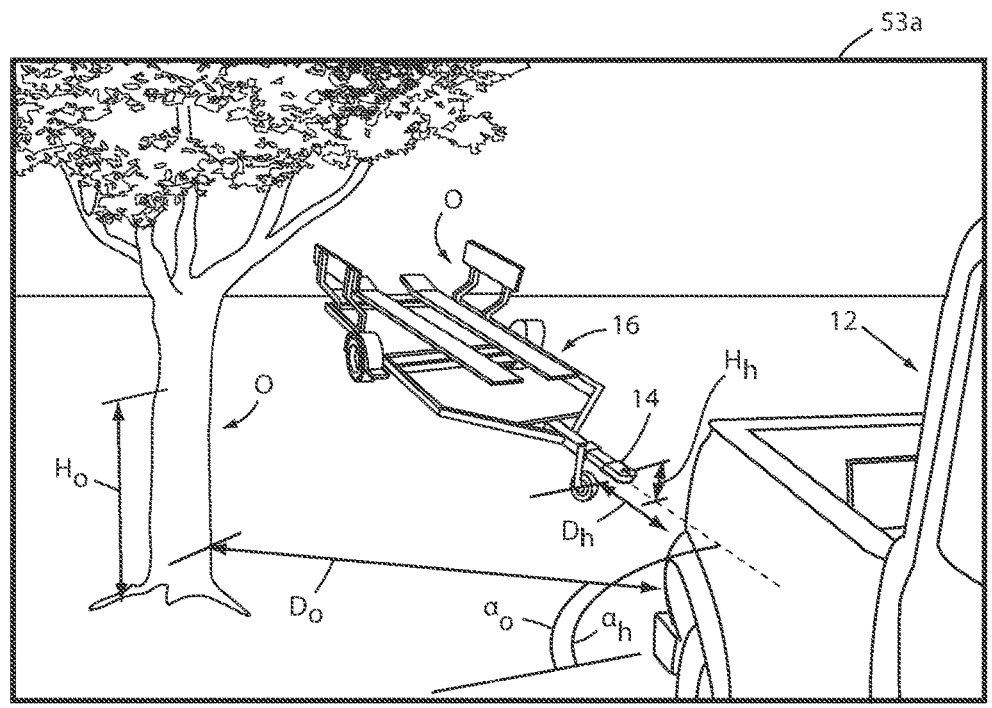
FIGS. 6A and 6B are depictions of images received from respective vehicle cameras during the alignment sequence step of FIG. 5.
Figure 6B:
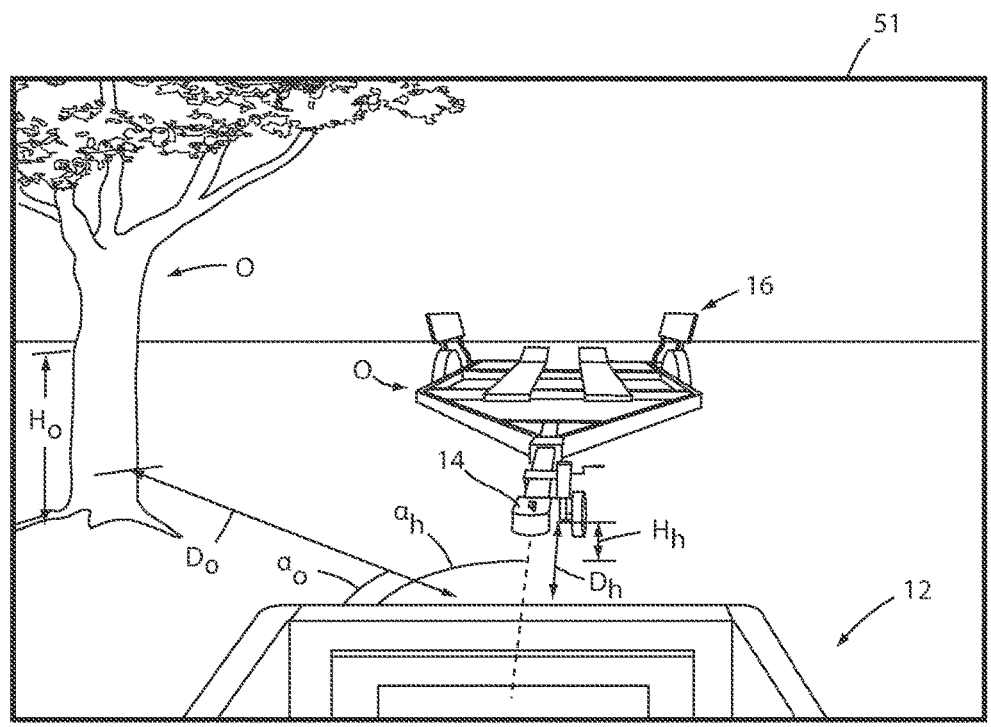

As shown in FIGS. 5, 6A, and 6B, at a location along movement of vehicle 12 along path 32, hitch 14 comes into the field of view 51 of CMHSL camera 50, at which point image processing routine 64 identifies hitch 14 within the additional image data 55 provided by CMHSL camera 50. Accordingly, when hitch 14 is identified within two sets of image data 55, the data sets can be used in a stereoscopic manner to reconstruct the three dimensional scene of the area surrounding vehicle 12 using the available image data 55 and including the positioning $D_h$, $\alpha_h$ and height $H_h$ of hitch 14. In this manner, the positioning $D_h$, $\alpha_h$ of hitch 14 can be used to update path derivation routine 66, if necessary, and can be used to update the positioning $D_h$, $\alpha_h$ of hitch 14 used in operating routine 68. As further shown, an additional obstacle O is present in the depicted fields of view 53a (FIG. 6A) and 51 (FIG. 6B). In this manner, obstacle O can be identified and its position $D_o$, $\alpha_o$ and height $H_o$ can be determined. In an embodiment, a maximum height of, for example the height of vehicle 12, or a mid-plane height of vehicle 12 can be set as a maximum detectable height, at which point, anything higher is simply assigned the maximum value to present errors in detecting prohibitively tall objects, such as the depicted tree. In an alternative embodiment, camera system 18 may include additional cameras such as a front-facing camera or side-facing cameras such that the depicted object O may be identified earlier and its estimated positioning (based on single camera two-dimensional data) taken into account in the initial derivation of path 32. In such an instance, the positioning of object O and determination of the height $H_o$ thereof may be updated when stereoscopic scene reconstruction including the object O is possible.

Figure 7:
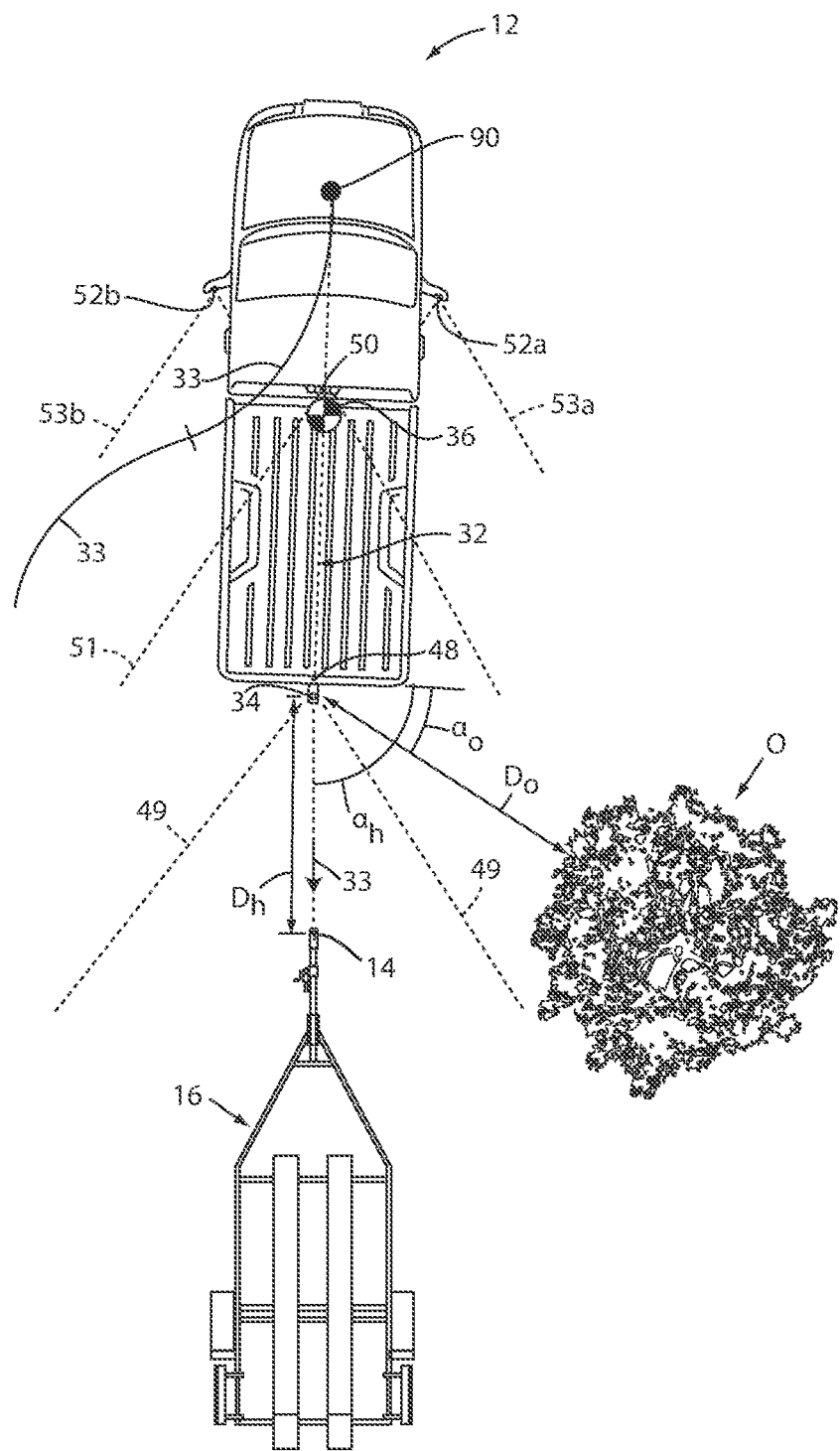
FIG. 7 is an overhead schematic view of the vehicle during a subsequent step of the alignment sequence with the trailer.
Figure 8:
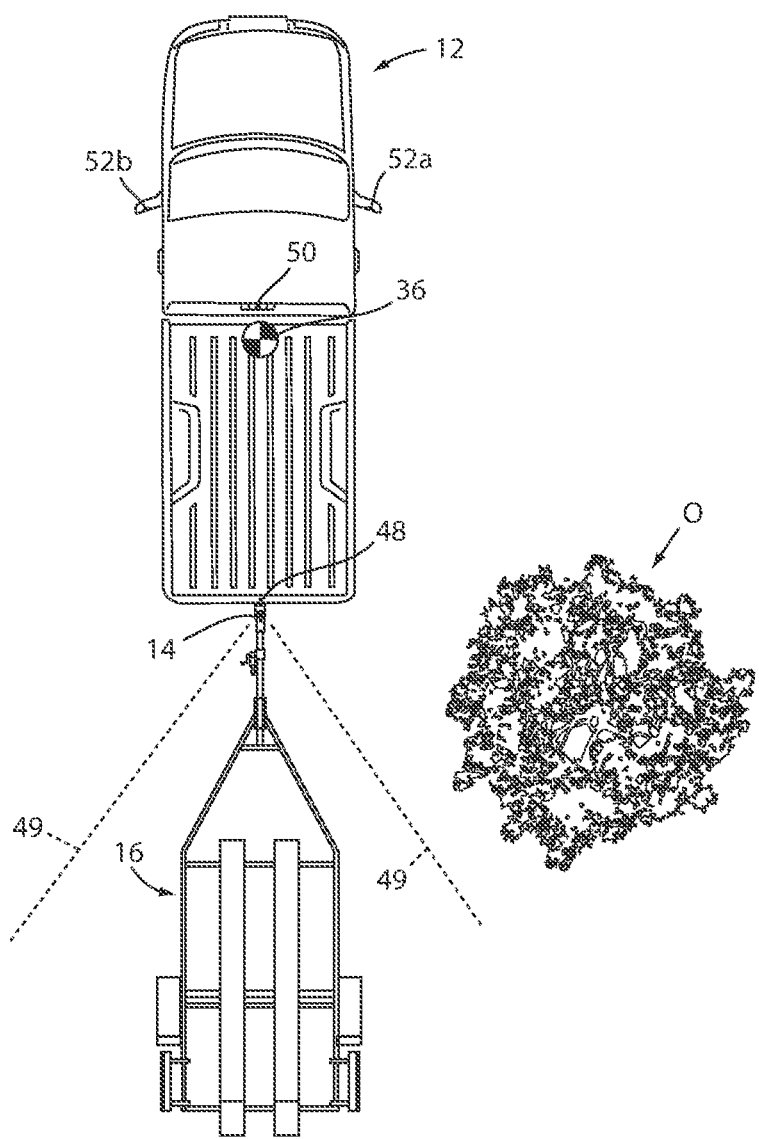
FIG. 8 is an overhead schematic view of the vehicle during a subsequent step of the alignment sequence with the trailer.

Turning now to FIG. 7, as mentioned above, as vehicle 12 approaches hitch 14, portions of vehicle 12 may block hitch 14 from being viewable within the fields of view 51, 53a, 53b of side cameras 52a, 52b and CMHSL camera 50, leaving only rear camera 48 to include hitch 14 within the image data 55 associated therewith. As discussed above, image processing routine 64 can continue to use the previously-obtained height $H_h$ information in tracking of hitch 14 within the available image data 55. In this manner, operating routine 68 may be able to effectively guide vehicle 12 into a position, shown in FIG. 8, in which hitch ball 34 is aligned with hitch 14 without resulting in a collision of vehicle 12 with trailer 16. In a further application, vehicle 12 may be equipped with a system or component that can allow controller 26 to lower hitch 14 to a height below the determined height $H_h$ of hitch 14. In various examples, the drawbar 35 (FIG. 1) to which hitch ball 34 is mounted may be moveably mounted to vehicle 12 by an actuator 87 or the like that can allow hitch ball 34 to be lowered by a lowering command output by controller 26 to move under hitch 14 and then raised into engagement with hitch 14 when appropriate alignment therewith has been achieved. In a similar manner, at least the rear suspension 84 (FIG. 2) can be equipped with actuators 86 (or adjustable dampers, etc.) to adjust the vehicle 12 height and, accordingly, the height of hitch ball 34 by lowering vehicle 12 on wheels 77. Such lowering can be done when hitch 14 is determined to be within a predetermined close distance (e.g., 1 ft. or 2 ft.) of hitch ball 34.

In the example discussed above, image processing routine 64 continuously monitors the positioning $D_h$, $\alpha_h$ of hitch 14 as well as the positioning $D_o$, $\alpha_o$ of any identified objects O within image data 55 during execution of operating routine 68. As discussed above, the position of vehicle 12 can be monitored by dead reckoning device 24 with the positions of objects O and hitch 14 being continuously updated and fed into path derivation routine 66 in case path 32 can be refined or should be updated (due to, for example, improved position information due to closer resolution or additional image data 55). In another embodiment, once position $D_h$, $\alpha_h$ of hitch 14, as well as the position $D_o$, $\alpha_o$ of any identified objects O has been determined using stereoscopic scene reconstruction, the hitch 14 and objects O can be placed in the scene, such as within the coordinate system and can be assumed static such that the tracking of the vehicle 12 position by dead reckoning system 24 tracks the position of vehicle 12 relative to the hitch 14 and identified objects O. Still further, the hitch 14 and objects O can be assumed to be static such that the position of vehicle 12 can be tracked by continuing to track the hitch 14 and objects O to remove the need for a dead reckoning system 24.

In a similar manner, a modified variation of operating routine 68 can progress through a predetermined sequence of maneuvers involving steering of vehicle 12 at a maximum steering angle δmax, while tracking the position $D_h$, $\alpha_h$ of hitch 14 to converge the known relative position of hitch ball 34 to the tracked position of hitch 14. In one aspect, the predetermined sequence can be determined to bring hitch 14 into multiple fields of view 49, 51, 53a, 53b, if needed, to determine positioning $D_h$, $\alpha_h$ of hitch 14 using stereoscopic information such that final advancing toward hitch 14 is possible using single-camera guidance with a desired level of accuracy, as discussed above. In one example, such sequences can include movement of vehicle 12 in a direction toward the identified position $D_h$, $\alpha_h$ of hitch 14, either in a forward direction (such as in FIG. 3, when hitch 14 is only visible in a single field of view 53a) or a rearward direction (such as if vehicle 12 is initially positioned as in FIG. 5, when hitch 14 is visible in multiple fields of view and is determined to be behind vehicle 12).

Figure 9:
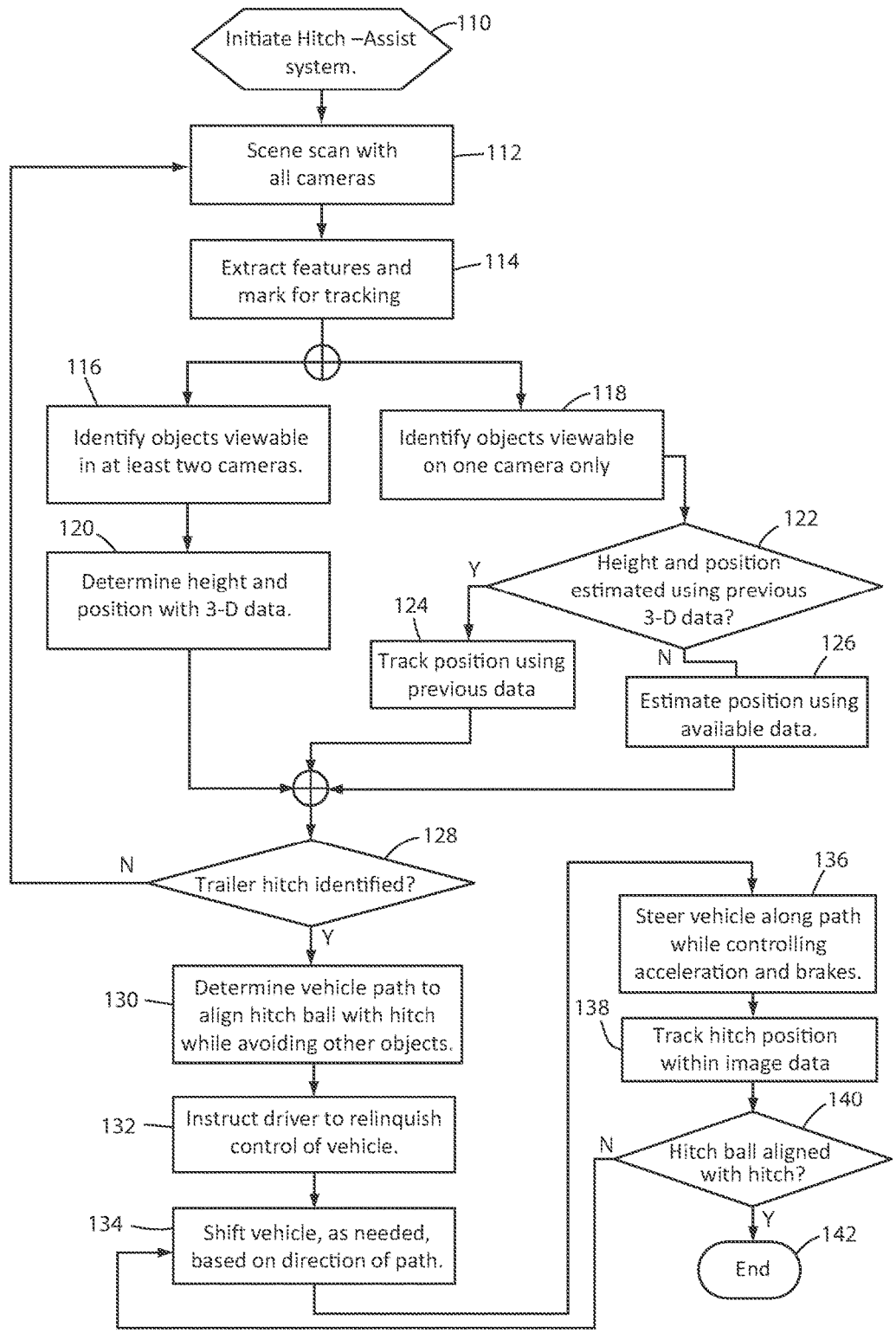
FIG. 9 is a flowchart depicting steps in the alignment sequence.

Turning now to FIG. 9, a flowchart showing steps in using hitch assist system 10 to align a vehicle hitch ball 34 with a trailer hitch 14 is shown. In particular, in step 110, the hitch assist system 10 is initiated. In an example, hitch assist system 10 can be initiated at any point when hitch 14 is in the field of view 49, 51, 53a, 53b of at least one camera 48, 50, 52a, 52b within camera system 18. Accordingly, once the system 10 is initiated, controller 26 can use camera system 18 to scan the viewable scene using cameras 48, 50, 52a, 52b (step 112). The scene scan step 112 be further used to then identify all objects that are viewable in at least two cameras (step 116) or those viewable in only a single camera (step 118). The height H and position D, α of any objects identified in step 116 can then be determined using the available stereoscopic image data 55 (step 120) as discussed above, including using image processing routine 64. If any objects are identified only in the image data 55 from a single camera, controller 26 determines if previous height H data is available (step 122). If height H data is available, the position D, α of the object in question is tracked using the available image data 55 in light of the previous height data, as discussed above (step 124). If height data is not available, then the position D, α is estimated using the available image data 55 (step 126).

As discussed above, image processing routine 64 can be programmed or otherwise configured to identify hitch 14 of trailer 16 within image data 55, which can be done initially within the scan (step 114). In this manner, after the results of the initial scene scan (step 112) are analyzed (steps 114-126), controller 26 can determine if hitch 14 has been identified (step 128). If hitch 14 has not been identified, the scene scan 112 can be continued, including while instructing driver to move vehicle 12 to better align with trailer 16, until hitch 14 is identified. When hitch 14 has been identified, the path derivation routine 66 can be used to determine the vehicle path 32 to align hitch ball 34 with hitch 14 while avoiding any other objects, designated as obstacles (by default, for example) in step 130. In this manner, the positioning $D_h$, $\alpha_h$ of hitch 14 and the positions $D_o$, $\alpha_o$ of any obstacles O are used to place the hitch 14 and objects O within the stored data relating the image coordinates with the real-world coordinates of the area surrounding vehicle 12. Subsequently, controller 26 uses path derivation routine 66 to determine a path 32 to align hitch ball 34 with hitch location 28, as described above with respect to FIGS. 3-8.

Once the path 32 has been derived, hitch assist system 10 can ask the user U to relinquish control of at least the steering wheel of vehicle 12 (and, optionally, the throttle 73 and brake, in the implementation of hitch assist system 10 described above wherein controller 26 assumes control of powertrain system 72 and brake system 70 during execution of operating routine 68) (step 132). When it has been confirmed that user U is not attempting to control steering system 20 (for example, using torque sensor 80, as discussed above), controller 26 determines if transmission system 92 is in the correct gear and, if necessary either causes transmission system 92 to shift to the desired gear or prompts the user U to shift to the desired gear (step 134). Hitch assist system 10 then controls steering system 20 (step 136) to maintain vehicle 12 along path 32 as either user U or controller 26 controls the velocity of vehicle 12 using powertrain system 72 and braking system 70. If vehicle 12 reaches an inflection point 90, further shifting or prompts to shift can be carried out. As discussed above, controller 26 or the user can control at least steering system 20, while tracking the position $D_h$, $\alpha_h$ of hitch 14 (step 138) until vehicle 12 reaches a point at which the vehicle 12 hitch ball 34 is aligned with trailer 16 hitch 14 (step 140), at which point operating routine 68 can end (step 142), either by controlling brake system 70 to cause vehicle 12 to stop (which can be done progressively as vehicle 12 approaches such a point), or by issuing a command to the user to stop vehicle 12 (which can also be done progressively or by a countdown as vehicle 12 approaches the desired location) before deactivating system 10 (step 142).

It is understood that the above method can be modified according to any of the hitch 14 or obstacle O tracking schemes discussed above, as well as the variations of operating routine 68 discussed above.

It is also to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle hitch assistance system, comprising:
first and second cameras on an exterior of the vehicle; and
an image processor programmed to:
   identify a first object in image data received from the first and second cameras as a hitch of a trailer and a second object in the image data as an obstacle; and
   combine the data received from the first and second cameras into stereoscopic image data;
   determine a height and a position of the hitch of the trailer and of the obstacle, respectively, using the image data by reconstructing a three-dimensional scene of a portion of an area surrounding the vehicle using the stereoscopic image data; and
a controller outputting a steering command to a vehicle steering system to guide the vehicle into alignment with the hitch of the trailer and to guide the vehicle away from the obstacle, including by processing two dimensional image data from one of the first or second vehicle cameras to track the position of the hitch of the trailer relative to the vehicle within the three-dimensional scene only when the trailer hitch is not present within image data from the other of the first and second cameras.

2. The hitch assistance system of claim 1, wherein the controller outputs the steering command to maintain the vehicle along a path derived by the controller to guide a hitch ball of the vehicle into alignment with the hitch of the trailer from an initial set of data received from the first and second cameras.

3. The hitch assistance system of claim 2, wherein the path is further derived by the controller to guide the vehicle away from the obstacle.

4. The hitch assistance system of claim 1, wherein:
the image processor is further programmed to track the position of the hitch using the stereoscopic image data during movement of the vehicle and output a tracked position of the hitch when the hitch is within the image data from both of the first and second cameras; and
the controller outputs the steering command according to a predetermined steering sequence, the controller progressing through the sequence based on the tracked position of the hitch to guide a hitch ball of the vehicle into alignment with the hitch.

5. The hitch assistance system of claim 4, wherein:
the image processor is further programmed to track the position of the obstacle using the stereoscopic image data during movement of the vehicle and output a tracked position of the obstacle when the obstacle is within the image data from both of the first and second cameras; and
the controller further progresses through the sequence based on the tracked position of the obstacle to guide the vehicle away from the obstacle.

6. A vehicle, comprising:
a steering system;
a hitch ball mounted on an exterior of the vehicle;
first and second cameras on the exterior; and
a hitch assistance system, including:
an image processor programmed to:
   combine the data received from the first and second cameras into stereoscopic image data;
   identify a first object in image data received from the first and second cameras as a hitch of a trailer and a second object in the image data as an obstacle; and
   determine a height and a position of the hitch of the trailer and of the obstacle, respectively, using the image data by reconstructing a three-dimensional scene of a portion of an area surrounding the vehicle using the stereoscopic image data; and
a controller outputting a steering command to the steering system to guide the hitch ball into alignment with the hitch of the trailer and to guide the vehicle away from the obstacle, including by processing two dimensional image data from one of the first or second vehicle cameras to track the position of the hitch of the trailer relative to the vehicle within the three-dimensional scene only when the trailer hitch is not present within image data from the other of the first and second cameras.

7. The vehicle of claim 6, wherein the controller outputs the steering command to maintain the vehicle along a path derived by the controller to guide the hitch ball into alignment with the hitch of the trailer from an initial set of data received from the first and second cameras.

8. The vehicle of claim 6, wherein:
the image processor is further programmed to track the position of the hitch using the stereoscopic image data during movement of the vehicle and output a tracked position of the hitch when the obstacle is within the image data from both of the first and second cameras; and
the controller outputs the steering command according to a predetermined steering sequence, the controller progressing through the sequence based on the tracked position of the hitch to guide the hitch ball into alignment with hitch.

9. The vehicle of claim 8, wherein:
the image processor is further programmed to track the position of the obstacle using the stereoscopic image data during movement of the vehicle and output a tracked position of the obstacle when the obstacle is within the image data from both of the first and second cameras; and
the controller further progresses through the sequence based on the tracked position of the obstacle to guide the vehicle away from the obstacle.

10. The vehicle of claim 6, further including one of an actuator coupled with the hitch ball or an adjustable suspension system, wherein:
the controller further determines a distance for a lowering command output to the actuator or the suspension system to lower the hitch ball to a position lower than the height of the hitch of the trailer.

11. A method for assisting a vehicle in hitching with a trailer, comprising:
processing image data received from first and second vehicle cameras to:
identify a hitch of the trailer and an obstacle in the image data received from the first and second cameras;
combine the data received from the first and second cameras into stereoscopic image data; and
determine a height and a position of the hitch of the trailer and of the obstacle, respectively, using the image data by reconstructing a three-dimensional scene of a portion of an area surrounding the vehicle using the stereoscopic image data; and controlling a vehicle steering system to guide the vehicle into alignment of a vehicle hitch ball with the hitch of the trailer and to guide the vehicle away from the obstacle, including by processing two dimensional image data from one of the first or second vehicle cameras to track the position of the hitch of the trailer relative to the vehicle within the three-dimensional scene only when the trailer hitch is not present within image data from the other of the first and second cameras.

12. The method of claim 11, wherein the first camera is a rear camera mounted on one of a trunk lid or a liftgate of the vehicle.

* * * * *